United States Patent [19]

Her

[11] Patent Number: 5,278,735
[45] Date of Patent: Jan. 11, 1994

[54] DISTRESS SIGNAL LAMP ASSEMBLY

[76] Inventor: Yih S. Her, 221, Sec. 2, Jong Shan Rd., Yeong Jing Shiang Changhua, Taiwan

[21] Appl. No.: 34,530

[22] Filed: Mar. 19, 1993

[51] Int. Cl.5 .................... F21V 21/08; F21V 21/22
[52] U.S. Cl. .................... 362/80.1; 362/397; 362/418
[58] Field of Search ............ 362/61, 80.1, 190, 191, 362/396, 397, 413, 414, 418, 430, 431

[56] References Cited

U.S. PATENT DOCUMENTS

| | | | |
|---|---|---|---|
| 2,675,545 | 4/1954 | Wolper | 362/397 |
| 2,905,925 | 9/1959 | Whiteneck | 362/397 |
| 4,613,847 | 9/1986 | Scolari et al. | 362/418 |
| 4,833,443 | 5/1989 | Siew | 362/80.1 |
| 4,870,543 | 9/1989 | Born et al. | 362/418 |
| 5,126,926 | 6/1992 | Chiang et al. | 362/80.1 |
| 5,155,667 | 10/1992 | Ho | 362/418 |

*Primary Examiner*—Richard R. Cole
*Attorney, Agent, or Firm*—Merchant, Gould, Smith, Edell, Welter & Schmidt

[57] ABSTRACT

Disclosed is a distress signal lamp assembly including a mounting base, which has a clamping frame and vacuum mounts for mounting on either door window or any smooth surface of an automobile alternatively, a cylindrical casing fastened to a top socket on the mounting base, a retractable tube made to slide in and out of the cylindrical casing, and a lamp head fastened to the retractable tube by a toggle joint.

1 Claim, 4 Drawing Sheets

DISTRESS SIGNAL LAMP ASSEMBLY

BACKGROUND OF THE INVENTION

1. Field of the Invention

The present invention relates to distress signals, and more particularly the present invention relates to a distress signal lamp assembly which can be conveniently mounted on an automobile and adjusted to the desired elevation.

2. Description of Prior Art

When a car is in distress, the driver of the car may place a distress sign 50 to 100 meters behind the car to give a warning signal to the cars coming behind. It is inconvenient to put a distress sign far behind the car in distress, more particularly to a disabled person. It is also dangerous to a woman to put a distress sign far behind the car when the car breaks down during the night. It is still not very safe when a distress sign is used, because a distress sign reflects light only within a limited distance. A collision may still happen when a behind car is suddenly stopped during its high speed running. Further, a distress sign will become less effective during a raining or foggy day.

SUMMARY OF THE INVENTION

The present invention has been accomplished under the aforesaid circumstances. It is therefore the main object of the present invention to provide a distress signal lamp assembly which can be conveniently and adjustably mounted on a motor vehicle in distress to give a warning signal at distance.

According to one aspect of the present invention, the distress signal lamp assembly is generally comprised of a mounting base to hold a retractable tube by a cylindrical casing, and a lamp head fastened to the retractable tube by a toggle joint. By sliding the retractable tube in and out of the cylindrical casing, the elevation of the lamp head is adjusted. According to another aspect of the present invention, the toggle joint has radial teeth alternatively meshed with corresponding radial teeth on a mounting rod at the bottom of the lamp head and releasably tightened up by a screw and a nut so that the angular position of the lamp head relative to the retractable tube can be adjusted. According to still another aspect of the present invention, the mounting base comprises a clamping frame having a transverse clamping rod at the entrance of a jaw thereof for mounting on a motor vehicle's door window. According to still another aspect of the present invention, the mounting base is attached with vacuum mounts at the bottom for mounting on a motor vehicle's roof or trunk lid.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
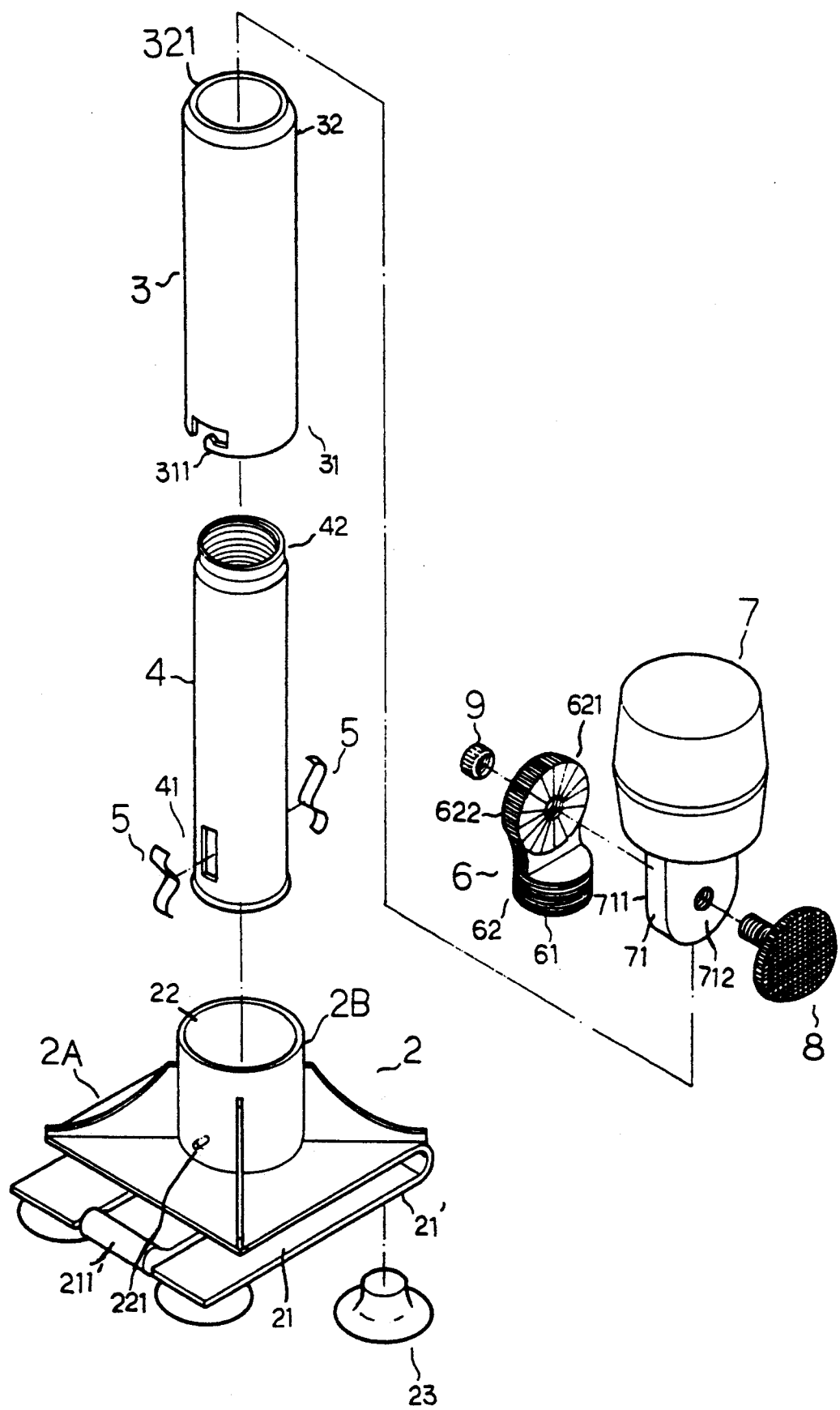
FIG. 1 is a perspective exploded view of a distress signal lamp assembly constructed according to the preferred embodiment of the present invention.
Figure 2:
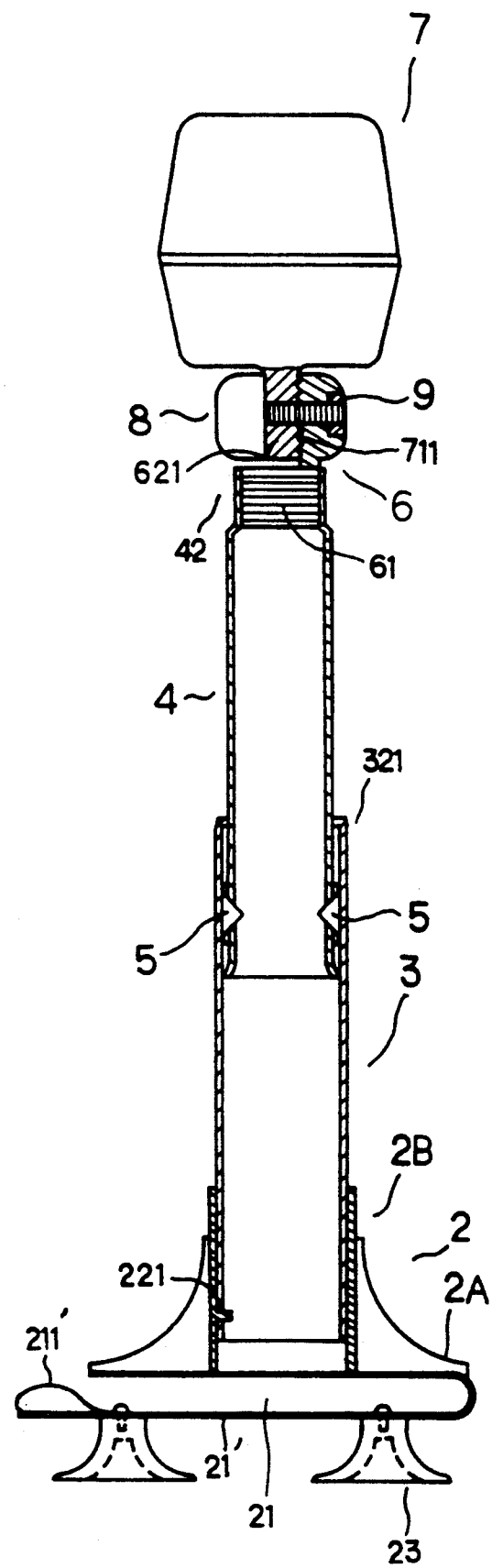
FIG. 2 is a sectional assembly view thereof.

Referring to FIGS. 1 and 2, a distress signal lamp assembly constructed in accordance with the present invention is generally comprised of a mounting base 2, a cylindrical casing 3, a retractable tube 4, two plate springs 5, a toggle joint 6, a lamp head 7, a screw 8, and a nut 9. The mounting base 2 comprises a clamping frame 2A attached with vacuum mounts 23, and top socket 2B upstanding from the clamping frame 2A to hold the cylindrical casing 3. The clamping frame 2A comprises a jaw 21 having at least one clamping rod 211' disposed on a bottom wall 21' thereof at the entrance of the jaw 21 for clamping on the glass of either door window of an automobile. The top socket 2B comprises a retainer rod 221 perpendicularly extended from the inside wall 22 thereof near the bottom. The cylindrical casing 3 comprises a retaining groove 311 on the bottom end 31 thereof, and an inward top flange 321 at the top end 32 thereof. By engaging the retainer rod 221 into the retaining groove 311, the cylindrical casing 3 is locked inside the top socket 2B. The retractable tube 4 comprises two rectangular slots 41 symmetrically formed on the sidewall near the bottom, and an inner thread 42 at the top. The plate springs 5 are corrugated, having each a projecting middle portion inserted into either rectangular slot 41 on the retractable tube 4 and two opposite ends stopped against the outside surface of the retractable tube 4. Therefore, the retractable tube 4 can be slided in and out of the cylindrical casing 3. When the retractable tube 4 is extended out of the cylindrical casing 3, the plate springs 5 will be stopped against the inward flange 321 of the cylindrical casing 3, and therefore the retractable tube 4 does not disconnect from the cylindrical casing 3. The toggle joint 6 comprises a bottom screw rod 61 threaded into the inner thread 42 of the retractable tube, and a flat, upright support 62 upstanding from the bottom screw rod 61 to hold the lamp head 7. The upright support 62 comprises a center through hole 622, through which the screw 8 is threaded, and teeth 621 radially extended outwards from the center through hole 622. The lamp head 7 comprises a flat mounting rod 71 at the bottom fastened to the upright support 62 by the screw 8 and the nut 9. The flat mounting rod 71 comprises a through hole 712, through which the screw 8 is threaded, and radial teeth 711 on one side thereof alternatively meshed with the teeth 621 on the upright support 62 of the toggle joint 6. By changing the order of the engagement of the teeth 621 on the upright support 62 with the teeth 711 on the flat mounting rod 71, the angular position of the lamp head 7 relative to the retractable tube 4 is adjusted.

Figure 3:
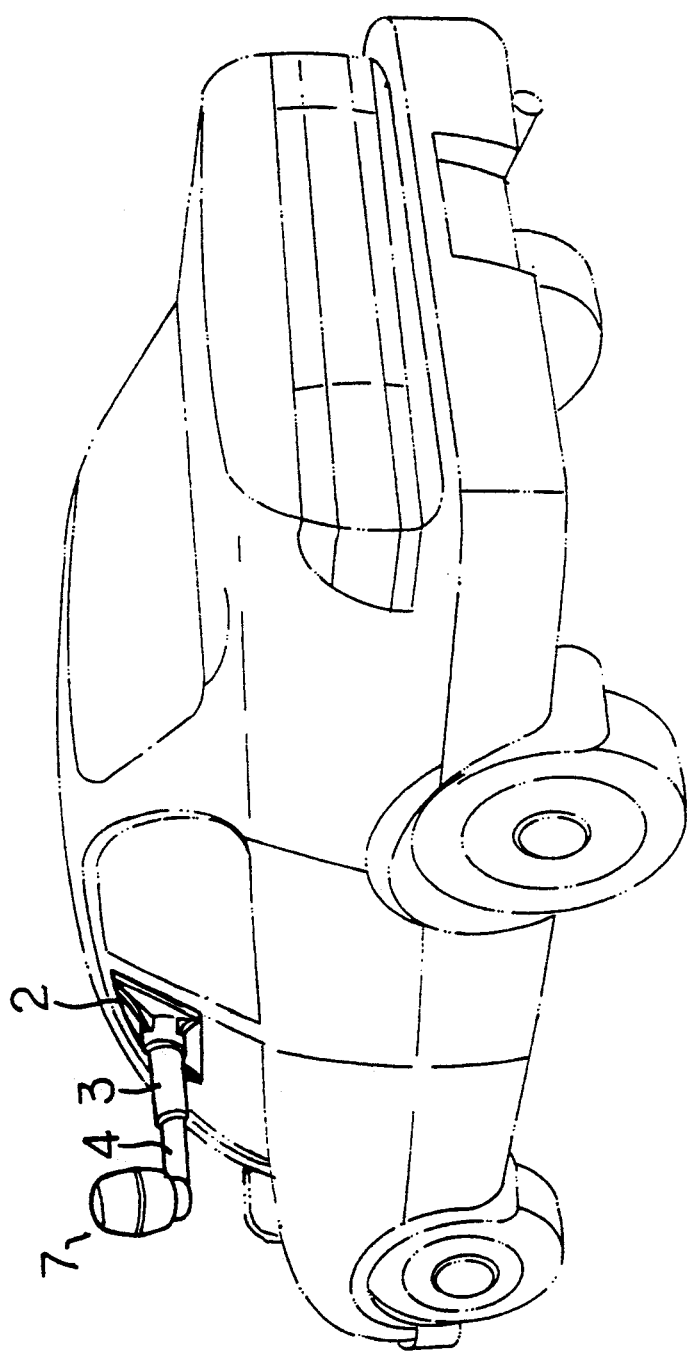
FIG. 3 is an installed view showing a distress signal lamp assembly of the present invention mounted on the window glass of one front door of an automobile.

Referring to FIG. 3, by means of the jaw 21 and the at least one clamping rod 211', the mounting base 2 can be conveniently mounted on the glass of an automobile's door window. When mounted, cylindrical casing 3 and the retractable tube 4 are disposed in horizontal, and the lamp head 7 is adjusted to a vertical position perpendicular to the toggle joint 6 frame 2A.

Figure 4:
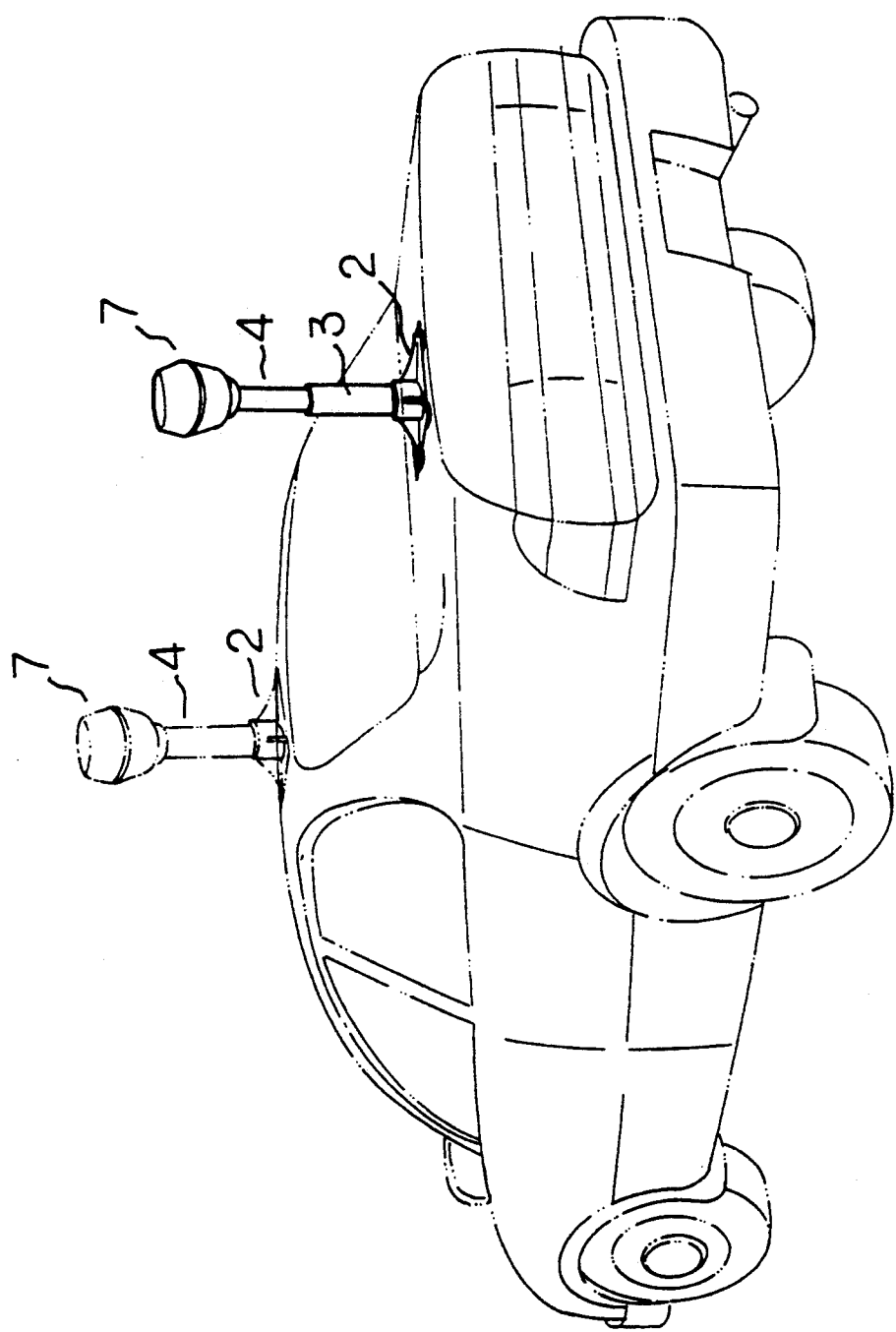
FIG. 4 is another installed view showing two distress signal lamp assemblies of the present invention respectively mounted on the roof and trunk lid of an automobile.

Referring to FIG. 4, by means of the vacuum mounts 23, the mounting base 2 can be fastened to an automobile's roof, trunk lid, or any smooth surface.

As indicated, the present invention is to provide a distress signal lamp assembly which cab be conveniently mounted on a motor vehicle in distress to give a warning signal at distance.

While only one embodiment of the present invention has been shown and described, it will be understood that various modifications and changes could be made without departing from the spirit and scope of the invention.

What is claimed is:

1. A distress signal lamp assembly comprising:

a mounting base having a top socket above a clamping frame, said clamping frame being attached with vacuum mounts on a bottom surface and having at least one clamping rod at an entrance of a jaw thereof for clamping on an automobile's door window, said top socket having a retainer rod on an inside surface;

a cylindrical casing fitted into said top socket of said mounting base, and having a retaining groove on a bottom end thereof, in which said retainer rod of said top socket locks, and an inward top flange on a top end thereof;

a retractable tube having a top and bottom made to slide in and out of said cylindrical casing, said retractable tube having to rectangular slots symmetrically disposed near the bottom and an inner thread at the top;

two corrugated plate springs respectively retained in said rectangular slots on said retractable tube for permitting said retractable tube to be slid in and out of said cylindrical casing and automatically retained in position;

a toggle joint having a bottom screw rod threaded into said inner thread of said retractable tube, and a flat, upright support upstanding from said bottom screw rod, said upright support having radial teeth on one side radially extended from a center through hole thereof;

a lamp head having a flat mounting rod, said flat mounting rod having a center through hole connected to the center through hole on said upright support of said toggle joint by a screw and a nut, and radial teeth respectively meshed with the radial teeth on said upright support of said toggle joint.

* * * * *